United States Patent [19]
Giavarini et al.

[11] Patent Number: 5,565,510
[45] Date of Patent: Oct. 15, 1996

[54] MIXTURES OF BITUMEN AND POLYMER COMPOSITION

[75] Inventors: Carlo Giavarini; Maria L. Santarelli; Marco Scarsella, all of Rome; Vittorio Braga, Ferrara, all of Italy

[73] Assignee: Montell North America Inc., Wilmington, Del.

[21] Appl. No.: 469,243

[22] Filed: Jun. 6, 1995

[30]   Foreign Application Priority Data

Oct. 25, 1994  [IT]  Italy ................................. MI94A2177

[51] Int. Cl.⁶ ....................................................... C08L 95/00
[52] U.S. Cl. ................................. 524/70; 524/59; 524/71; 524/68
[58] Field of Search ............................ 524/59, 70, 71, 524/69, 68

[56]   References Cited

U.S. PATENT DOCUMENTS

| | | | |
|---|---|---|---|
| 5,070,123 | 12/1991 | Moran | 524/69 |
| 5,095,055 | 3/1992 | Moran | 524/70 |
| 5,360,849 | 11/1994 | Braga et al. | 524/71 |

FOREIGN PATENT DOCUMENTS 592852  4/1994  European Pat. Off. .

*Primary Examiner*—Peter A. Szekely

[57]   ABSTRACT

A bituminous mixture having improved physical properties is obtained by adding to a bitumen a polyphosphoric acid (I) containing phosphorus, calculated as $P_2O_5$, in amount from 80% to 87% by weight, and a polymer composition (II) comprising (A) a propylene homopolymer or copolymer, (B) optionally an ethylene copolymer fraction insoluble in xylene at ambient temperature and (C) a copolymer fraction soluble in xylene at ambient temperature.

5 Claims, No Drawings

MIXTURES OF BITUMEN AND POLYMER COMPOSITION

The present invention relates to a process for the preparation of a mixture of bitumen and certain polymer compositions and to the bituminous mixture thus obtained.

Published European patent application 592852, describes a bituminous mixture wherein the polymer component consists of a composition containing:

A) 10–40 parts by weight of an isotactic propylene homopolymer having an isotactic index greater than 80, or a random copolymer of propylene with ethylene or a $C_4$–$C_{10}$ α-olefin or with mixtures thereof, said copolymer having 1 to 10% by weight of ethylene or $C_4$–$C_{10}$ α-olefin or mixtures thereof ranging from 1 to 10%, and an isotactic index greater than 80;

B) 0–20 parts by weight of a copolymer fraction containing ethylene, insoluble in xylene at ambient temperature; and C) 50–80 parts by weight of a copolymer fraction of ethylene with propylene or a $C_4$–$C_{10}$ α-olefin, or mixtures thereof, and optionally a minor amount of a diene, said copolymer fraction being soluble in xylene at ambient temperature and having an intrinsic viscosity in tetrahydronaphthalene at 135° C. greater than 1.5 and up to 2.2 dl/g.

The above mixture has improved mechanical properties compared to the corresponding bitumen alone, and significant stability in terms of storage, since the physical properties of the mixture undergo only a slight deterioration over the course of time.

U.S. Pat. No. 5,070,123 teaches that the physical properties and storage stability of a mixture of bitumen and a polymer such as styrene-butadiene-styrene (SBS), ethylene-vinyl acetate (EVA) or linear low density polyethylene (LLDPE), can be improved by causing the bitumen to react with an inorganic acid such as HCl or $H_3PO_4$ at 85% by weight. The $H_3PO_4$ at 85% by weight is characterized by a phosphorus content, calculated as $P_2O_5$, of about 60–73% by weight, and comprises orthophosphoric acid, which can contain up to 13% by weight of pyrophosphoric acid.

Surprisingly it has now been found that improved physical properties of the mixtures are obtained by adding polyphosphoric acid containing phosphorus, calculated as $P_2O_5$, in amount from 80% to 87% by weight, to a bitumen and by blending the bitumen and the polyphosphoric acid with a composition of the type described in published European patent application 592852.

Therefore, an embodiment of the present invention comprises a process for the preparation of a mixture of bitumen and a polymer composition, said process comprising adding a polyphosphoric acid (I) containing phosphorus, calculated as $P_2O_5$, in amount from 80% to 87% by weight, preferably from 83% to 85% by weight, to a bitumen and then blending the resulting product with a polymer composition (II) which comprises:

A) 10–40, preferably 20–40, parts by weight of an isotactic propylene homopolymer having an isotactic index greater than 80, preferably from 85 to 98, or a random copolymer of propylene with ethylene or a $C_4$–$C_{10}$ α-olefin or mixtures thereof, said copolymer having 1 to 10% by weight of ethylene or $C_4$–$C_{10}$ α-olefin or mixtures thereof, and an isotactic index greater than 80;

B) 0–20 parts by weight of a copolymer fraction containing ethylene with propylene or a $C_4$–$C_{10}$ α-olefin or mixtures thereof, insoluble in xylene at ambient temperature;

C) 50–80, preferably 60–80, parts by weight of a copolymer fraction of ethylene with propylene or a $C_4$–$C_{10}$ α-olefin or mixtures thereof, and optionally a minor quantity of a diene, said copolymer fraction being soluble in xylene at ambient temperature.

In said process according to the present invention the polyphosphoric acid (I) is added in an amount from 1% to 5% by weight, preferably from 1.5% to 3% by weight, with respect to the bitumen, and the polymer composition (II) is blended with the resulting bitumen mixture in an amount from 1% to 15% by weight with respect to the bitumen/polyphosphoric acid mixture.

To obtain satisfactory results it is sufficient to use the polymer composition (II) in amount from 1% to 5%, for instance from 2% to 3%, by weight with respect to the bitumen/polysphoric acid mixture.

In contrast with what is described in published European patent application 592852, in the process of the present invention and in the bituminous mixture thereby obtained the intrinsic viscosity of fraction (C) is not critical. For example, the intrinsic viscosity of fraction (C) of polymer composition (II) can be from 1.5 to 3.4 dl/g (determined in tetrahydronaphthalene at 135° C.).

The bitumens suitable for use in the process of the present invention are those regularly used in flush-coating and paving, including the types obtained by straight-run distillation (hereinafter referred to as "SR bitumens") and those deriving from visbreaking (hereinafter referred to as "VB bitumens").

Particularly preferred are SR bitumens having a boiling point, at atmospheric pressure, of at least 380° C., and an asphaltenes content of from 5 to 20%, preferably from 7 to 12% by weight (determined according to IP 143 standard).

The polyphosphoric acid (I) used in the process of the present invention has a phosphorus content, calculated as $P_2O_5$, ranging from 80 to 87% by weight, and the corresponding CAS—Chemical Abstract Services—number is 8017-16-1. Said polyphosphoric acid contains a high quantity of long-chain molecules (see for example "Phosphorus and its compounds", Interscience Publishers, Inc., New York, 1958, Vol I, page 748). These long-chain molecules are totally absent in the phosphoric acid at 85% by weight, which acid, as mentioned above, has a phosphorus content, calculated as $P_2O_5$, around 67–73% by weight of the acid.

In the polymer composition (II), the amount of ethylene or $C_4$–$C_{10}$ α-olefin or mixtures thereof, optionally present in fraction (A) is preferably from 2% to 5% by weight, while in fraction (C) the amount of ethylene is preferably from 15% to 60% by weight, more preferably from 25% to 45% by weight.

The preferred amount of diene units in fraction (C) is from 1% to 4% by weight.

Fraction (B) consists of a basically linear crystalline copolymer, preferably having a content of propylene or $C_4$–$C_{10}$ α-olefin or mixtures thereof ranging from 5% to 30% by weight. When said fraction (B) is present, it is preferable that it be in an amount greater than or equal to 1 part by weight.

Examples of $C_4$–$C_{10}$ α-olefin which may be present in fractions (A) and (B) are 1-butene, 1-pentene, 4-methyl-1-pentene, 1-hexene and 1-octene.

Examples of dienes optionally present in fraction (C) are 1,4-hexadiene, 1,5-hexadiene, bicyclopentadiene and ethylidene-norbornene.

Polymer composition (II) can be prepared either by melt blending fraction (A) with fraction (C) and optionally with fraction (B) or by a process comprising at least two polymerization stages (sequential polymerization): in the first, or first ones, fraction (A) is produced, while the optional fraction (B) and fraction (C) are produced in the subsequent stages. In this process a Ziegler-Natta catalyst supported on magnesium chloride is used. Examples of polymerization processes of this type are described in published European patent application 411627.

Optionally, the compositions obtained directly from the polymerization processes before being used in the process of the present invention, can be subjected to controlled degradation treatment (visbreaking), using known methods, in the presence of an organic peroxide, for example.

Preferably polyphosphoric acid (I) is added to the bitumen before the addition of the polymer composition (II).

The admixing of polyphosphoric acid (I) with bitumen preferably takes place at a temperature from 120° to 160° C.

The addition of the polymer composition (II) to the bitumen occurs by blending at a temperature preferably from 160° to 180° C.

It is also advantageous if, before adding the polymer composition (II), the bitumen and polyphosphoric acid mixture is agitated for 1–2 hours, at a temperature of 160° to 180° C. to obtain a reaction between bitumen and polyphosphoric acid (I). Such reaction is considered to be complete when semi-transparent spheroidal particles can be seen in the bitumen with an optical microscope.

All the admixing and blending stages can be carried out by using mixers normally employed in the preparation of bituminous mixtures. The following examples are given to illustrate but not limit the present invention.

Table 1 shows the properties of specific embodiments of polymer compositions (II) used in the preparation of the mixtures with bitumen.

In reference to said table, composition i) is a heterophasic copolymer obtained by sequential polymerization, using a high-yield and highly stereospecific Ziegler-Natta catalyst supported on magnesium chloride. The heterophasic copolymer comprises:

A) 35% by weight of a crystalline copolymer of propylene with 3.5% by weight of ethylene, having an isotactic index of about 90%;

B) 2% by weight of a copolymer fraction insoluble in xylene at ambient temperature;

C) 63% by weight of a propylene-ethylene copolymer fraction, containing 27% by weight of ethylene, which is soluble in xylene at ambient temperature.

Polymer compositions ii) and iii) were obtained from polymer composition i), by extruding i) with 200 and 400 ppm, respectively, of Luperox 101 2,5-dimethyl-2,5-di(tert-butylperoxy)hexane. The extrusion was carried out at a speed of 100–200 rpm and at a temperature of 170°–210° C., using a Werner co-rotating twin-screw extruder, having a length/diameter ratio=20/30.

TABLE 1

| Polymer composition | MFR (ASTM D-1238, condition L) dg/min | Total I.V. dl/g | I.V. (1) dl/g | I.V. (2) dl/g |
| --- | --- | --- | --- | --- |
| i) | 0.6 | 2.70 | 3.20 | 1.50 |
| ii) | 4.0 | 1.75 | 1.98 | 1.33 |
| iii) | 8.0 | 1.52 | 1.66 | 1.21 |

Note to Table 1
I.V. = intrinsic viscosity in tetrahydronaphthalene at 135° C.;
Total I.V. = I.V. of the total composition;
I.V. (1) = I.V. of the polymer fraction soluble in xylene;
I.V. (2) = I.V. of the polymer fraction insoluble in xylene.

Table 2 shows the characteristics of the bitumens used for the mixtures. Said bitumens are obtained by straight-run distillation.

TABLE 2

| Bitumen | R & B °C. | Penetration dmm | Asphaltene % weight |
| --- | --- | --- | --- |
| SR 1 | 44.0 | 133 | 8,9 |
| SR 2 | 47.0 | 135 | 11.8 |
| SR 3 | 43.5 | 160 | 9.7 |

Notes to Table 2
R & B = Ring and Ball, determined according to ASTM D-36
Penetration = determined according to ASTM D-5
Asphaltenes = content of asphaltenes determined according to IP 143 standard.

EXAMPLES 1–7

In a Silverstone L4R mixer equipped with homogenizing head, polyphosphoric acid containing 84% by weight of phosphorus, calculated as $P_2O_5$, was added to a bitumen preheated at 120° C. The polyphosphoric acid was added, in all the Examples, in amount equal to 3% by weight with respect to the bitumen.

While maintaining the resulting mixture under agitation at 4000 rpm, the temperature of the mixture was brought to 180° C. by a thermostatic heating cover, and was maintained for one hour at that temperature.

A polymer composition (II) was then added to the mixture, and the mixing continued for one hour at about 180° C. The product thus obtained was then characterized.

Table 3 shows, for each Example, the type of bitumen used, the identity and amount of the specific polymer composition (II) that was added (the amount being in % by weight with respect to the weight of the bitumen and polyphosphoric acid mixture) and the properties of the end product.

TABLE 3

| Example No. | Bitumen | Composition (II) Type & % weight | R & B °C. | Penetration dmm |
| --- | --- | --- | --- | --- |
| 1 | SR 1 | ii) 2% | 80.0 | 43 |
| 2 | SR 2 | ii) 2% | 81.0 | 48 |
| 3 | SR 2 | iii) 3% | 94.0 | 37 |
| 4 | SR 2 | iii) 5% | 99.0 | 32 |
| 5 | SR 2 | iii) 10% | >100 | 26 |
| 6 | SR 2 | i) 3% | 100 | 34 |
| 7 | SR 3 | ii) 2% | 91.0 | 45 |

See Notes for Table 2.

Samples of the products of Examples 2–5 were also inspected with an optical microscope to determine their homogeneity, which proved to be excellent, and their stability.

The specimens used to determine the stability of the mixture were prepared by the following method. An aluminum tube (12 cm long and 2 cm in diameter) was filled with the sample and kept in the vertical position for 3 days at 160° C. Subsequently the tube was cut transversely in three parts. Specimens of the sample were obtained from the upper and lower parts and were subjected to the Ring and Ball test. In this manner was calculated the difference between the Ring and Ball values of the specimen from the upper part of the tube and of the specimen from the lower part. For the products of Examples 2–5 said difference was less than or equal to 2° C.

Comparative Example 1

The mixture was made as in Example 1, except that instead of polyphosphoric acid, the same quantity of 85% by weight phosphoric acid, containing 61.5% by weight of phosphorus, calculated as $P_2O_5$, was used.
The resulting product had the following properties:

| | |
|---|---|
| Ring and Ball: | 51° C. |
| Penetration: | 80 dmm |
| Optical microscope analysis: | insufficient homogeneity, lower than that of Examples 2–5. |
| Stability: | the Ring and Ball values in the two specimens corresponding to the upper and lower part of the tube differ by 6° C. |

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A process for the preparation of a mixture of bitumen and a polymer composition, said process comprising adding polyphosphoric acid (I) containing phosphorus, calculated as $P_2O_5$, in amount from 80% to 87% by weight to a bitumen, and then blending the resulting product with a polymer composition (II) which comprises:

A) 10–40 parts by weight of an isotactic propylene homopolymer having an isotactic index greater than 80, or a random copolymer of propylene with ethylene or a $C_4$–$C_{10}$ α-olefin or mixtures thereof, said copolymer having 1 to 10% by weight of ethylene or $C_4$–$C_{10}$ α-olefin or mixtures thereof, and an isotactic index greater than 80;

B) 0–20 parts by weight of a copolymer fraction containing ethylene with propylene or a $C_4$–$C_{10}$ α-olefin or mixtures thereof, insoluble in xylene at ambient temperature;

C) 50–80 parts by weight of a copolymer fraction of ethylene with propylene or a $C_4$–$C_{10}$ α-olefin or mixtures thereof, and optionally a minor quantity of a diene, said copolymer fraction being soluble in xylene at ambient temperature;

the phosphoric acid (I) being added in an amount from 1% to 5% by weight with respect to the bitumen, and the polymer composition (II) being blended with the resulting bitumen in an amount from 1% to 15% by weight with respect to the bitumen/polyphosphoric acid mixture.

2. The process of claim 1, wherein the polyphosphoric acid (I) is added to the bitumen before the polymer composition (II) is added.

3. The process of claim 2, wherein before adding the polymer composition (II), the mixture of bitumen and polyphosphoric acid (I) is maintained under agitation for 1–2 hours, at a temperature from 160° C. to 180° C.

4. The process of claim 1, wherein the bitumen is obtained by straight-run distillation and has a boiling point, at atmospheric pressure, of at least 380° C. and a content of asphaltenes from 5 to 20% by weight.

5. A mixture of bitumen and polymer composition obtained by the process of claim 1.

* * * * *